(12) United States Patent
Walters et al.

(10) Patent No.: US 11,228,644 B1
(45) Date of Patent: Jan. 18, 2022

(54) SYSTEMS AND METHODS TO GENERATE CONTEXTUAL THREADS

(71) Applicant: Capital One Services, LLC, McLean, VA (US)

(72) Inventors: Austin Walters, Savoy, IL (US); Galen Rafferty, Mahomet, IL (US); Jeremy Goodsitt, McLean, VA (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/093,707

(22) Filed: Nov. 10, 2020

(51) Int. Cl.
*G06F 15/173* (2006.01)
*H04L 29/08* (2006.01)

(52) U.S. Cl.
CPC ................ *H04L 67/1002* (2013.01)

(58) Field of Classification Search
CPC ................ H04L 67/1002
See application file for complete search history.

(56) References Cited

U.S. PATENT DOCUMENTS

| | | | |
|---|---|---|---|
| 7,600,017 B2 | 10/2009 | Holtzman et al. | |
| 9,092,434 B2* | 7/2015 | Kumar | G06F 16/48 |
| 10,587,553 B1* | 3/2020 | Ghafourifar | G06F 40/205 |
| 2006/0271630 A1* | 11/2006 | Bensky | G06Q 10/107 |
| | | | 709/206 |
| 2008/0077672 A1* | 3/2008 | Knight | H04L 51/34 |
| | | | 709/206 |
| 2009/0177484 A1* | 7/2009 | Davis | G06F 16/285 |
| | | | 705/346 |
| 2013/0007137 A1* | 1/2013 | Azzam | H04L 51/16 |
| | | | 709/206 |
| 2013/0262593 A1* | 10/2013 | Srikrishna | H04L 51/34 |
| | | | 709/206 |
| 2013/0273976 A1* | 10/2013 | Rao | H04L 12/1822 |
| | | | 455/563 |
| 2016/0065519 A1* | 3/2016 | Waltermann | H04L 67/10 |
| | | | 709/206 |
| 2016/0071517 A1* | 3/2016 | Beaver | G10L 15/22 |
| | | | 704/9 |
| 2016/0196561 A1* | 7/2016 | Iyer | G06Q 30/016 |
| | | | 705/304 |
| 2016/0366074 A1* | 12/2016 | Bastide | H04L 51/32 |
| 2018/0287982 A1* | 10/2018 | Draeger | H04L 51/16 |
| 2018/0367483 A1* | 12/2018 | Rodriguez | H04L 51/04 |
| 2018/0367484 A1* | 12/2018 | Rodriguez | H04L 67/36 |
| 2019/0281001 A1* | 9/2019 | Miller | G06N 20/00 |
| 2019/0297035 A1* | 9/2019 | Fox | G06F 16/24575 |

* cited by examiner

*Primary Examiner* — Razu A Miah
(74) *Attorney, Agent, or Firm* — Bookoff McAndrews, PLLC

(57) ABSTRACT

A computer-implemented method includes receiving a plurality of messages in a thread associated with a topic, providing the plurality of messages to a machine learning model configured to classify messages based on groupings, identifying, by the machine learning model, a first grouping associated with a first subset of the plurality of messages in the thread, wherein the first grouping is identified based on the first subset of the plurality of messages deviating from the topic, initiating a new thread comprising the first subset of the plurality of messages, determining a first user group comprising a first plurality of users associated with the first subset of the plurality of messages and granting the first user group access to the first thread.

19 Claims, 7 Drawing Sheets

SYSTEMS AND METHODS TO GENERATE CONTEXTUAL THREADS

TECHNICAL FIELD

Various embodiments of the present disclosure relate generally to generating contextual threads, and, more particularly, to systems and methods for automatically allocating messages in a thread to more applicable threads to reduce congestion and resource allocation.

BACKGROUND

Many businesses, institutions, and other entities use communication platforms to share, provide, and/or exchange information via messages sent and received within the communication platform. Such communication platforms are used on a daily basis and generate unprecedented amounts of data as the amount of communication amongst individuals and entities increases. The number of communication platforms and the use of available communication platforms also increases with the increased number of devices per individual increases, enabling faster, more efficient, and more easily accessible communication via the communication platforms.

However, multiple users may access a communication platform and multiple topics may be discussed within a thread accessible via the communication platform. Multiple topics within the given thread often cause confusion, disjointed discussions, and/or a lack of participation. Some or most of the users participating in a thread may not be interested in each of the multiple topics of discussion and, accordingly, may lose interest in the thread, resulting in the lack of participation. Providing all the messages to each of the users may unnecessarily use storage and may cause device memory congestion.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for generating contextual threads based on aggregation of messages. In one aspect, an exemplary embodiment of a computer-implemented method includes receiving a plurality of messages in a thread associated with a topic, providing the plurality of messages to a machine learning model configured to classify messages based on groupings, identifying, by the machine learning model, a first grouping associated with a first subset of the plurality of messages in the thread, wherein the first grouping is identified based on the first subset of the plurality of messages deviating from the topic, initiating a new thread comprising the first subset of the plurality of messages, determining a first user group comprising a first plurality of users associated with the first subset of the plurality of messages and granting the first user group access to the first thread.

In another aspect, an exemplary embodiment of a computer-implemented method includes receiving a first plurality of messages from a first platform, receiving a second plurality of messages from a second platform, adapting the first plurality of messages and the second plurality of messages to generate a combined plurality of messages, providing the combined plurality of messages to a machine learning model configured to classify messages based on groupings, identifying, by the machine learning model, a first grouping associated with a first subset of the plurality of messages and initiating a first thread comprising the first subset of the plurality of messages, identifying, by the machine learning model, a second grouping associated with a second subset of the plurality of messages and initiating a second thread comprising the second subset of the plurality of messages, and providing the first thread and the second thread via at least one of the first platform, the second platform, or a third platform.

In another aspect, a system may include a data storage device storing processor-readable instructions, an aggregation bot comprising a machine learning model configured to classify messages based on topics, a processor operatively connected to the data storage device and configured to execute the instructions to perform operations that include receiving a plurality of messages, providing a first version of the plurality of messages to the aggregation bot, identifying, by the aggregation bot, a first topic associated with a first subset of the plurality of messages and initiating a first thread comprising the first subset of the plurality of messages, identifying, by the aggregation bot, a second topic associated with a second subset of the plurality of messages and initiating a second thread comprising the second subset of the plurality of messages, determining a first user group comprising a first plurality of users associated with the first subset of the plurality of messages and granting the first user group access to the first thread, and determining a second user group comprising a second plurality of users associated with the second subset of the plurality of messages and granting the second user group access to the second thread, wherein the first user group and the second user group comprise at least one non-overlapping user.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

Like reference numbers and designations in the various drawings indicate like elements.

DETAILED DESCRIPTION OF EMBODIMENTS

Figure 1:
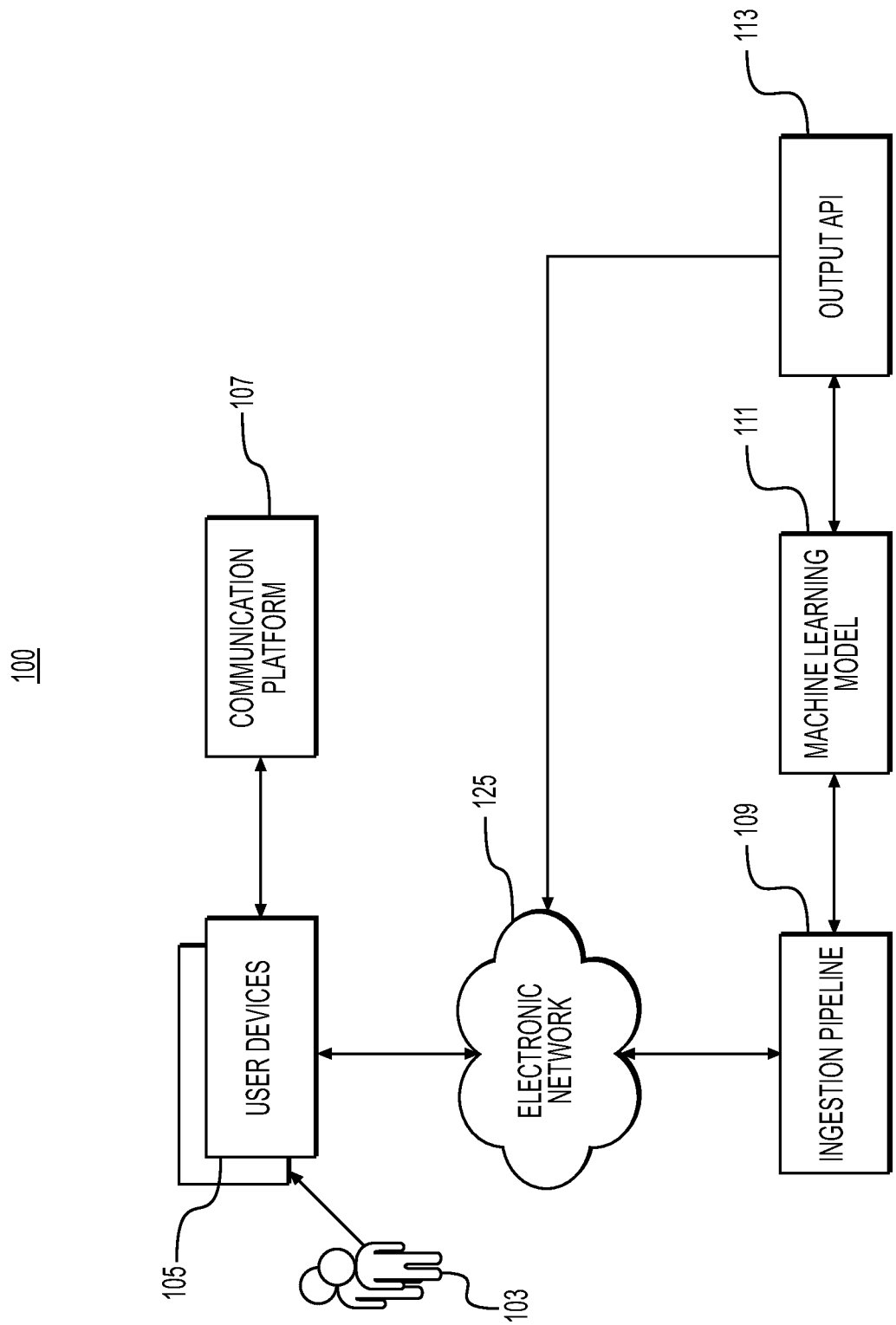
FIG. 1 depicts an exemplary computing environment for generating contextual threads, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

As used herein, a "communication platform" generally encompasses any platform that enables communication between two or more users (e.g., individuals, groups, companies, organizations, bots, artificial intelligence responders, etc.). The communication may be via "messages" which can include, but are not limited to, text-based messages, sound-based messages, graphics, pictures, videos, images, emojis, or the like or a combination thereof. As non-limiting examples, communication platforms may include discussion threads, chat threads, email threads, social media communication, video chat threads, proprietary communication platforms, persistent chat rooms, direct messages, or the like.

As used herein, a "thread" generally encompasses a group of messages presented as being associated with each other (e.g., via a chat room, message group, message chain, etc.). The group of messages in a thread may be from multiple users. A group of "users", which may be individuals, groups, companies, organizations, bots, artificial intelligence responders, or the like, may have access to a given thread. The access may be public access such that the group of users may include any users. Alternatively, access may be restricted to a private set of groups (e.g., as part of an organization, community, subgroup, team, project, etc.). According to an implementation, messages in a single thread may be exchanged over two or more communication platforms, as further discussed herein.

According to implementations of the disclosed subject matter, a main thread in a communication platform may be initiated and may include a plurality of users. The thread may be initiated by a single user, by plurality of users, by the communication platform, and/or by an organization or third party. All users in the thread may have the same permissions and clearances. Alternatively, each user or a subset of the plurality of users in the thread may have a respective permission and/or clearance. For example, each user or a subset of the plurality of users may have either read, write, or read and write privileges. Similarly, each user or a subset of the plurality of users may have clearance to be exposed to (e.g., to read or receive) messages related to a given topic.

Once initiated, the thread may receive messages from all or some of the plurality of users. The messages may be exchanged at any applicable frequency including within seconds, minutes, hours, days, weeks, etc. from each other. The messages may be provided via any user device that is configured to provide messages to a thread via the communication platform. For example, user devices may include software (e.g., an application) installed that enables users to directly access a thread and provide messages to the thread using the user device. Alternatively, user devices may have access to (e.g., locally or via a cloud implementation) an application programming interface (API) that converts messages originating from a user device (e.g., based on user input) such that the messages can be received by the communication platform and be applied to a corresponding thread.

The messages in a thread of a communication platform may be provided to a machine learning model. The machine learning model may be trained using a training dataset including contextually correlated messages such that a selected learning algorithm learns to identify contextually related messages to generate the machine learning model. According to an implementation, the training dataset may be messages that are part of a specific thread that is related to a given topic. The given topic may be a narrow topic such that each or a subset of the messages may be associated with the topic. The learning algorithm may be one or more of a transformer, a multi-headed attention network utilizing a convolutional neural network (CNN), a long short-term memory (LSTM), an auto encoder (AE), a variational auto encoder (VAE), or the like. A bidirectional encoder representations from transformers (BERT) technique may be refit or utilized and may have an embedding layer that could be used to plug into a learning algorithm. The embedding layer may support interpretation of text and may be previously trained. The machine learning model may receive the messages in the thread as inputs and may provide an output indicating whether two or more of the received messages are related to the same grouping. A grouping may be based on topics (e.g., if the two or more messages are related to the same topic, different topics, unrelated topics, secure topics, etc.) and/or may also be based on one or more of a frequency of messages or a subset of a group of users providing the messages. For example, a main thread may be an on-going thread that then receives a burst of messages at a frequency. The burst of messages may be related to a subset of the topic of the main thread, to one or more other topics, or to a secure topic. Based on detecting the burst of messages, the machine learning model may group the burst of messages in a grouping, and a new thread may be initiated for that grouping of messages. Contextual designations may be iterative such that a designation occurs each time a new message is generated and/or provided to the thread and depending on whether that decision is correct, or not, the machine learning model is updated (e.g., applicable weights are changed and/or reinforced). Alternatively, such contextual designations may be implemented such that a designation occurs in batches upon reaching a threshold number of messages and/or a threshold amount of time.

Implementations disclosed herein provide a number of technical benefits including reduction in resources used, faster processing, and more efficient electronic communication. For example, by removing messages related to groupings identified by a machine learning model from a main thread, the main thread itself may be able to load faster and use less processing power, cloud communication, and/or memory as messages related to that grouping may no longer be provided via the main thread.

Additionally, messages in a main thread may be available to a larger number of users than in a sub-thread. Accordingly, removing messages corresponding to a grouping from a main thread would result in less pulls by each of the users of the main thread that would not retrieve the corresponding messages via the main thread, and render a lower number of users of the sub-thread, and their user devices, to retrieve the corresponding messages only. Such reduction in resources and/or the reduction in messages may also allow for faster processing by each user device, memory, processor, and/or cloud server that is used to access the main thread and/or the sub-thread. Additionally, contextually generated threads may enable more efficient electronic communication as they provide targeted grouping-based communication without non-grouping based noise.

For simplicity, this disclosure provides examples where groupings of messages are determined based on topics. However, it will be understood that a topic is one of a number of factors that can be used to determine a grouping. A grouping of messages may be based on one or more topics, but may also be based on a frequency of messages, a subset of users providing the messages, a geographical location of the origination of a subset of the messages, and/or any deviation to a main thread including a deviation to a topic of the main thread.

FIG. 1 depicts an exemplary computing environment 100 that may be utilized with techniques presented herein. In some embodiments, the computing environment 100 is, includes, and/or forms a portion of a contextual thread generator. One or more user device(s) 105, a communication platform 107, an ingestion pipeline 109, a machine learning model 111, and/or an output API 113 are part of the computing environment 100. Some or all of the components shown in computing environment 100 may communicate across an electronic network 125. Each user device 105 may be associated with a respective user 103 or multiple users may use the same user device 105. The ingestion pipeline 109 may receive messages exchanged via the communication platform 107 and may modify the corresponding content for input into the machine learning model 111. The output of the machine learning model may be provided to the output API 113 that may modify the output of the machine learning model 111 for subsequent input as messages for the communication platform 107. The output API 113 may provide the modified output of the machine learning model 111 via the electronic network 125.

The systems and devices of the computing environment 100 may communicate in any arrangement. As will be discussed herein, systems and/or devices of the computing environment 100 may communicate in order to operate a contextual thread generator, e.g., by automatically generating sub-threads based on the context of messages provided in a main thread.

The user devices 105 may include a computer system such as, for example, a desktop computer, a mobile device, a tablet, a laptop, a wearable device such as a smart watch, smart glasses, etc. In an exemplary embodiment, a user device 105 is a telephone, e.g., a cellular phone, or the like. In some embodiments, the user device 105 may include one or more electronic application(s) (e.g., a program, plugin, etc.), installed on a memory of the user device 105. The electronic applications may be programs such as an electronic mail client, a text messaging application, a chat application, a social media application, a video chat application, a voice communication application, or the like. In some embodiments, the electronic application(s) may be associated with one or more of the other components in the computing environment 100. For example, the electronic application(s) may include a portal for accessing and/or interacting with one or more of the other components in the computing environment 100.

The communication platform 107 may be accessed by the user devices 105 automatically or based on user action. The communication platform 107 may access the electronic network 125 via the user devices 105. The user devices 105 may send or receive communication platform 107 messages via the electronic network 125. For example, a first mobile phone may be used to send a message using an application associated with the communication platform 107. The communication platform 107 may make the message available to a second mobile phone that also hosts the application associated with the communication platform 107, via the electronic network 125. The electronic network 125 may be a cloud based network and the message from the first mobile phone may be stored at the electronic network 125. The second mobile phone may access the stored message from its connection to the electronic network 125 and/or may download the stored message from the electronic network 125. It will be understood that references made herein to a communication platform (e.g., communication platform 107, 506, and/or 507) may refer to applications on user devices 105 that correspond to the communication platform.

In various embodiments, the electronic network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

The ingestion pipeline 109 may move a stream of messages and/or batched messages from the communication platform 107 to a data lake configured to apply the messages to the machine learning model 111. The ingestion pipeline 109 may organize the messages, remove metadata, apply context (e.g., temporal context, structural context, etc.), or the like such that the output of the ingestion pipeline 109 can be used as input to the machine learning model 111.

The machine learning model 111 may be trained using a dataset including contextually correlated messages such that a selected learning algorithm learns to identify contextually related messages to generate the machine learning model 111. For example, the selected learning algorithm may be provided a number of question messages grouped with corresponding answer messages such that the selected learning algorithm is trained to identify a question and a corresponding answer to that question. Similarly, the selected learning algorithm may be provided contextually related messages such that the selected learning algorithm is trained to identify a relationship between two or more messages based on the context of the messages. The trained selected learning algorithm may be used to generate the machine learning model 111.

According to an implementation, the machine learning model 111 may be based on one or more learning algorithms, such as a clustering algorithm, natural language processing algorithm, or the like. The one or more learning algorithms may be stored in a memory. As used herein, a machine learning model 111 may include instructions, algorithms, data, representations of data, or the like that are usable, for example, to correlate data and/or identify relationships between aspects of messages. A "machine learning model" further generally encompasses a model that may be trained, e.g., via a set of training data and one or more labels assigned to the set of training data, to generate an output for a particular input. Any suitable type of model may be used for the machine learning model 111, such as, for example, a neural network, a deep learning network, a genetic learning algorithm, or the like, or combinations thereof.

Although depicted as separate components in FIG. 1, it should be understood that a component or portion of a component may, in some embodiments, be integrated with or incorporated into one or more other components. For example, a portion of the communication platform 107 may be provided to the user device 105 as an electronic portal via an electronic application. At least a portion of the ingestion pipeline 109, machine learning model 111, and/or output API 113 may be part of the same component or may all be implemented within the electronic network 125. Further, it should be understood that data described as stored on a memory of a particular system or device in some embodiments, may be stored in another memory or distributed over a plurality of memories of one or more systems and/or devices in other embodiments.

In the methods below, various acts are described as performed or executed by components from FIG. 1. However, it should be understood that in various embodiments, various components of the computing environment 100 discussed above may execute instructions or perform acts including the acts discussed below. Further, it should be understood that in various embodiments, one or more steps may be added, omitted, and/or rearranged in any suitable manner.

Figure 2:
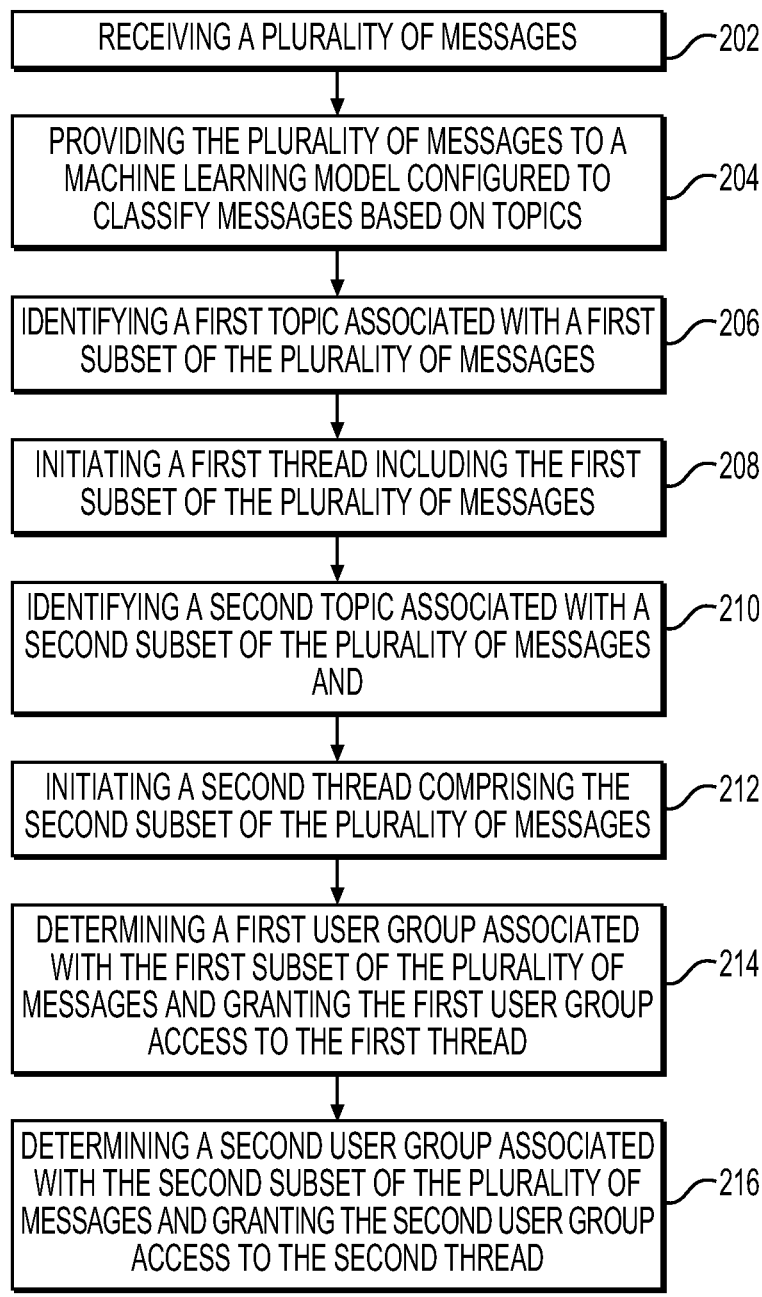
FIG. 2 depicts a flowchart of an exemplary method for generating contextual threads, according to one or more embodiments.

FIG. 2 illustrates an exemplary process 200 for generating contextual threads, e.g., via a machine learning model 111, such as in the examples discussed above. The process 200 is directed to topic-based aggregation of messages from a communication platform 107, based on one or more topics associated with a subset of the messages. As noted herein, a topic-based aggregation of messages is one way in which messages may be associated with a grouping. At 202 of FIG. 2, a plurality of messages may be received. The plurality of messages may be received via a single communication platform 107, as discussed based on process 200 of FIG. 2 or via multiple communication platforms 107, as further discussed based on process 600 of FIG. 6. The plurality of messages may be generated using one or more user devices 105, such as via inputs provided to the user devices 105. The inputs may be any applicable input including touch, keystrokes, voice commands, gestures, taps, gaze, electrical signal, photograph, video, audio, haptic input, etc. The user devices 105 may convert the inputs into the plurality of messages based on hardware, software, and/or firmware associated with each respective user device 105 and/or based on one or more software configurations of the respective communication platform 107 itself. For example, a user may activate a communication platform 107 using her mobile phone. The communication platform 107 may have a graphical user interface (GUI) that enables the user to input text using the mobile phone's touch keyboard. The user may enter a message directly into an ongoing thread or may start a new thread using the communication platform 107. The user's message along with one or more messages generated either by the user or one or more other users may be received at a cloud platform via electronic network 125.

The plurality of messages may be fed (e.g., filtered) through an ingestion pipeline 109, as described herein. According to an implementation, the ingestion pipeline 109 may be configured for the communication platform 107 and may move the plurality of messages from the communication platform 107 to a data lake configured to apply the messages to the machine learning model 111. The ingestion pipeline 109 may organize the messages, modify data (e.g., metadata, content, etc.), apply context (e.g., temporal context, structural context, etc.), or the like such that the output of the ingestion pipeline 109 can be used as input to the machine learning model 111.

The ingestion pipeline 109 may organize the messages based on threads, based on users, user profiles, or user devices 105 associated with respective messages, based on times each of the messages were sent or received, or based on any other applicable attribute. The ingestion pipeline 109 may group the messages such that a group of messages are arranged in a format that is accepted as an input to the machine learning model 111. As an example, the machine learning model 111 may accept, as inputs, a minimum of three consecutive messages to determine whether one or more of the three consecutive messages is contextually separate from the rest or from a previous set of messages. The ingestion pipeline 109 may receive messages as they are generated and, according to this example, may group the messages in batches of a minimum of three messages before providing them to the machine learning model 111.

The ingestion pipeline 109 may remove data from the messages prior to providing the modified messages to the machine learning model 111. For example, the ingestion pipeline 109 may convert pictographs (e.g., emojis) into American Standard Code for Information Interchange (ASCII) symbols prior to providing the respective messages to the machine learning model 111. As another example, the ingestion pipeline 109 may include or may access an image recognition software that converts messages including images into their contextual meaning prior to providing the respective messages to the machine learning model 111.

The ingestion pipeline 109 may also apply context to messages or portions of messages. The context may be one or more of temporal context, structural context, user information, platform context, etc. The context may be related to the content of the message and may apply some additional information that is available to the ingestion pipeline 109. For example, a given contextual platform 107 may have a reply feature that enables a user to tag a previous message when providing a new message. The ingestion pipeline 109 may add pointers to the previous message prior to providing the new message to the machine learning model 111. As another example, a message may include the word "early" and, based on the presence of the word "early", the ingestion pipeline 109 may add an indication of the time at the corresponding user's location when providing the respective messages to the machine learning model 111.

At 204 of FIG. 2, the plurality of messages received at 202 of FIG. 2 may be provided to machine learning model 111. The machine learning model 111 may be a regression model, a decision tree model, a naïve Bayes model, a k-means model, a random forest model, a reduction model, and/or a gradient boosting model. The machine learning model 111 may be trained using a dataset that includes previously correlated messages. The previously correlated messages may be auto correlated based on context. For example, the previously correlated messages may be auto correlated based on a user directly responding to a message, a user tagging a message as related, content in a message, or the like. The previously correlated messages may be used by a learning algorithm to generate the machine learning model 111.

The generated machine learning model 111 may receive the plurality of messages as inputs into the model. The plurality of messages may be provided to the machine learning model 111 in real-time or near real time, in batches, based on frequency of messages, and/or based on user attributes associated with the messages.

The plurality of messages may be provided to the machine learning model 111 in real-time or near real-time. Real time may correspond to less than one minute and near-real time may correspond to less than three minutes. According to this implementation, the messages may be received at the machine learning model 111 as the messages are generated by the user devices 105 via the communication platform 107, via electronic network 125, and filtered through the ingestion pipeline 109. The machine learning model 111 may output results based on the messages provided in real-time (or near real-time) alone or may also use previously provided messages as input along with the messages provided in real-time (or near real-time). According to this implementation, the machine learning model 111 may receive the previously provided messages from the communication platform 107 via electronic network 125 or may receive them from a storage or memory component at the electronic network 125 or ingestion pipeline 109 and/or may receive them from a storage or memory component of the machine learning model 111.

The plurality of messages may be provided to the machine learning model 111 in batches. Each batch may include a minimum threshold of messages that are provided to the machine learning model 111. The minimum threshold of messages in a batch may be predetermined or may be determined based on one or more of a frequency of messages, a user provided value, a communication platform, a user category (e.g., an admin, a correspondent, a member, a non-member, etc.).

Past messages may be stored in a memory or storage associated with the communication platform 107, user devices 105, electronic network 125, ingestion pipeline 109, and or the machine learning model 111. For example, messages may be stored in such a memory or storage until the minimum threshold of messages is accumulated to form a batch to be input into the machine learning model 111. As another example, messages may be stored in such a memory or storage such that one or more topics can be identified in reference stored messages. According to this example, a new message may correspond to the same topic as a previously received message, based on the previously received message and the new message being determined as related to the same topic by the machine learning model 111.

The machine learning model 111 may be configured to classify messages based on groupings. According to the example implementation of FIG. 2, the groupings are based on topics. However, it will be understood that the machine learning model 111 may be configured to classify messages based on a subset of a topic, a frequency of messages, a subset of users providing the messages, a geographical location of the origination of a subset of the messages, and/or any deviation to a main thread including a deviation to a topic of the main thread. The machine learning model 111 may receive a plurality of messages as input and may identify one or more topics that all or some of the plurality of messages are associated with. Each message of the plurality of messages may be categorized as being associated with a topic or may be categorized as unrelated to any topic. A given message that is categorized as being associated with a given topic or as unrelated to any topic may later be categorized as being associated with a topic based on, for example, additional messages received at a time after the given message.

At 206 of FIG. 2, a grouping based on a first common topic associated with a first unclassified subset of the plurality of messages may be identified and the first unclassified subset of the plurality of messages may be classified as being related to the first topic. The first topic and its corresponding messages may be identified by the machine learning model 111 based on one or more of the content of the messages, context of the messages, relationships between messages, times when the messages are generated, users associated with the messages, tags provided in the messages, or the like. The first topic identified by the machine learning model 111 may be designated a code or pointer such that the computing environment 100 may reference the first topic and/or the associated messages based on the code or pointer. The code or pointer may be any applicable designator such as a numerical value, hash value, reference value, or the like.

At 208 of FIG. 2, a first thread may be initiated and may include the first subset of the plurality of messages associated with the first topic. According to other implementations, the first thread may be initiated based on groupings that are based on factors other than topics, as disclosed herein. The first thread may be initiated via the communication platform 107 such that users may use the user devices 105 to access the first thread via the communication platform 107. All or some of the plurality of messages included in the first thread may be a subset of the messages that were in a main thread. All or some of the plurality of messages included in the first thread may be removed from the main thread such that they are only available via the first thread.

The first thread may be initiated when threshold number of messages from a main thread are identified as corresponding to the first topic. For example, the machine learning model 111 may identify two messages that are associated with a first topic. However, the threshold number of messages may be three messages and, accordingly, a first thread may not be initiated until an additional message is associated with the first topic by the machine learning model 111. The threshold number of messages for initiating a thread may be determined based on one or more of a frequency of messages, a user provided value, a communication platform 107, and/or a user category (e.g., an admin, a correspondent, a member, a non-member, etc.). An example of such threshold number of messages is discussed herein via Topic 2 of FIG. 3.

According to an implementation, a single message may be associated with multiple topics. As an example, a first message may be associated with a first topic and a second topic. The first message may be moved to the first thread, may also be moved to a second thread, as further disclosed herein, and/or may remain in the main thread. According to this example, multiple copies of the first message may exist such that the first message may be provided in the first thread, the second thread, and/or the main thread.

At 210 of FIG. 2, a grouping based on a second common topic associated with a second subset of the plurality of messages may be identified. The second topic and its corresponding messages may be identified by the machine learning model 111 based on one or more of the content of the messages, context of the messages, relationships between messages, times when the messages are generated, users associated with the messages, tags provided in the messages, or the like. The second topic identified by the machine learning model 111 may be designated a code or pointer such that the computing environment 100 may reference the first topic and/or the corresponding messages based on the code or pointer. The code or pointer may be any applicable designator such as a numerical value, hash value, reference value, or the like.

At 212 of FIG. 2, a second thread may be initiated and may include the second subset of the plurality of messages associated with the second topic. According to other implementations, the second thread may be initiated based on groupings that are based on factors other than topics, as disclosed herein. The second thread may be initiated via the communication platform 107 such that users may use the user devices 105 to access the second thread via the communication platform 107. All or some of the plurality of messages included in the second thread may be a subset of the messages that were in a main thread, and were provided to the machine learning model 111. All or some of the plurality of messages included in the second thread may be removed from the main thread such that they are only available via the second thread.

At 214 of FIG. 2, a first user group associated with the first subset of the plurality of messages may be determined. The first user group may include a plurality of users that generated the plurality of messages that correspond to the first topic identified at 206 of FIG. 2. The first user group may be granted access to the first thread. Similarly, at 216 of FIG. 2, a second user group associated with the second subset of the plurality of messages may be determined. The second user group may include a plurality of users that generated the plurality of messages that correspond to the second topic identified at 210 of FIG. 2. The second user group may be granted access to the second thread.

The first user group and the second user group may include at least one non-overlapping user such that the first user group is different than the second user group. The first user group may provide one or more first thread messages via the first thread such that these one or more messages are not included in the main thread or the second thread. Similarly, the second user group may provide one or more second thread messages via the second thread such that these one or more messages are not included in the main thread or the first thread.

According to an implementation, an access permission may be determined for each user associated with an initiated thread (e.g., first thread at 206, second thread at 210, etc.). The access permission for a given user may be based on the given user's credentials, classification, position, security settings, or the like. The access permission may further be determined based on the given groupings. According to the example provided in FIG. 2, the access permission may be further determined based on the topic associated with the initiated thread (e.g., based on the first topic, second topic, etc.), where each or some of the initiated threads may have a security level, clearance level, position level, or credential requirement associated with them based on, for example, their corresponding topic.

As an example, a plurality of messages may be generated using user devices 105 via a main thread of communication platform 107, at 202 of FIG. 2. The plurality of messages may be provided via the electronic network 125 and may be provided to a machine learning model 111 via an ingestion pipeline 109, at 204. The machine learning model 111 may determine that a first subset of the plurality of messages is associated with a secure grouping, such as a secure topic at 206 and a secure thread including the first subset of the plurality of messages at 208 may be initiated. The secure thread may have a top secret clearance requirement based on the secure topic. A first user group with a plurality of users, each of whom sent at least one message in the first subset of the plurality of messages may be marked to be associated with the secure thread based on their generation of messages determined to be related to the secure thread. However, an access permission may be determined for each of the users and only users that meet or exceed the top secret clearance requirement may continue to be associated with and may gain access to the secure thread at 214.

According to an implementation, one or more users that do not generate a message associated with a grouping that requires a clearance (e.g., the secure topic in the example above) may gain access to the thread associated with that grouping if the one or more users meets or exceeds the access permission required for the thread associated with the grouping. Continuing the example above, a user with top secret clearance that did not send at least one message in the first subset of the plurality of messages may be associated with the secure thread based on the top secret clearance, even though the user did not send any messages that were designated to be in the secure thread.

Figure 3:
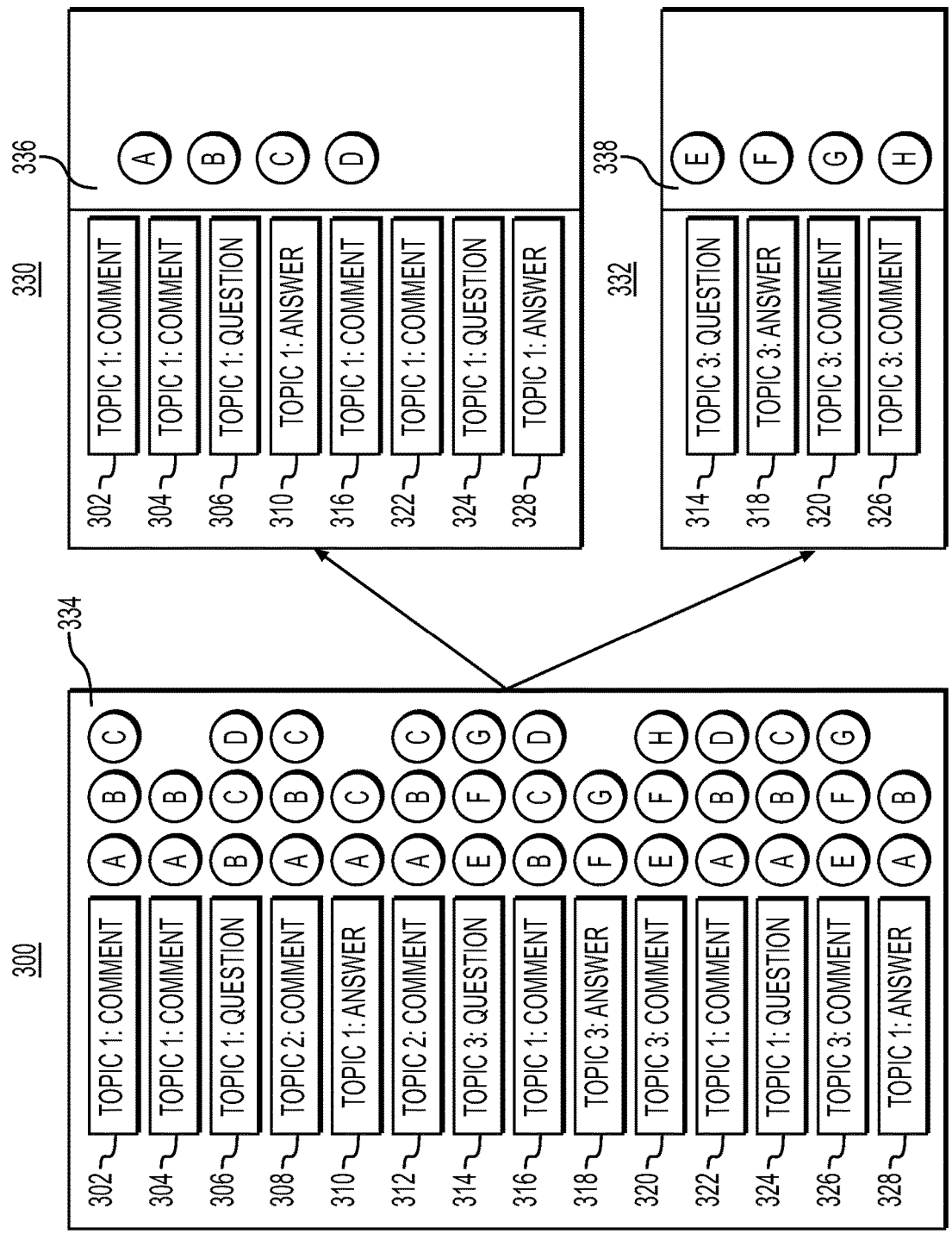
FIG. 3 depicts an exemplary method for generating contextual threads based on a main thread, according to one or more embodiments.

FIG. 3 depicts an exemplary method for initiating contextual threads from a main thread, based on exemplary process 200 of FIG. 2. A communication platform 107 may receive a plurality of messages 302-328 in a main thread 300. Each message from the plurality of messages 302-328 may be generated by, interacted with, or otherwise may be associated with the one or more users listed in user panel 334. Interaction with a message may correspond to an impression associated with the message (e.g., a like, a dislike, etc.), a flagging of the message, a response to the message, a team member of the user that initiated the message, or the like. An association with a message may be, for example, a tag, a follow, a mention, content associated with a relation with a user (e.g., mentioning a project the user is working on). For example, message 302 may be generated by User A and may mention User B. User C may select a "Like" button to interact with the message 302. Accordingly, the User A, User B, and User C may be associated with the message 302. Similarly, for example, message 304 may be generated by User B and may be flagged by User A such that User A may receive a notification if a response to message 304 is generated. Accordingly, User A and User B may be associated with message 304.

The plurality of messages 302-328 may be provided to the machine learning model 111 via ingestion pipeline 109 and the machine learning model 111 may determine which grouping (e.g., Topic 1, Topic 2, and Topic 3) each message is associated with. Although FIG. 3 shows that each of the plurality of messages 302-328 is associated with a grouping, a given message in a main thread (e.g., main thread 300) may not be associated with any determined grouping.

The machine learning model 111 may determining which topic some or all of the plurality of messages 302-328 are associated with and, accordingly, sub-thread 330 associated with Topic 1 and sub-thread 332 associated with Topic 3 may be generated. Sub-thread 330 may include messages 302, 304, 306, 310, 316, 322, 324, and 328. As shown in panel 336, User A, User B, User C, and User D may each have access to sub-thread 330 based on their generation, interaction, or association with at least one of the messages in sub-thread 330. To clarify, the group of users that are granted access to sub-thread 330 may be those users that either generated a message included in sub-thread 330, interacted with a message included in sub-thread 330, or are otherwise associated with a message included in sub-thread 330. Similarly, sub-thread 332 may include messages 314, 318, 320, and 326. As shown in panel 338, User E, User F, User G, and User H may each have access to sub-thread 332 based on their generation, interaction, or association with at least one of these messages.

As disclosed herein, a minimum threshold number of messages may be required for initiation of a grouping based thread. In the example provided in FIG. 3, the minimum threshold number of messages may be three messages. As shown, it may be determined by the machine learning model 111 that messages 308 and 312 are associated with Topic 2. However, since only two messages (i.e., messages 308 and 312) are associated with Topic 2, no sub-thread based on Topic 2 may be initiated as Topic 2 does not meet the minimum threshold number of messages. It will be understood that a sub-thread based on Topic 2 may be initiated at a later time, if the minimum threshold number of messages is met. As disclosed herein, the messages related to Topic 1 and/or Topic 3 may remain in the main thread 300 once sub-thread 330 and/or 332 are initiated. Alternatively, the messages related to Topic 1 and/or Topic 3 may be removed from the main thread 300 once sub-thread 330 and/or 332 are initiated. According to an implementation, the messages related to Topic 1 and/or Topic 3 may remain in the main thread 300 for an amount of time once sub-thread 330 and/or 332 are initiated, and then may be removed from the main thread 300 after the expiration of the amount of time.

A message may be associated with two or more groupings. For example, machine learning model 111 may determine that a given message is associated with a first grouping due to all or part of the content within the message and may determine that the given message is also associated with a second grouping. The machine learning model 111 may weigh the two or more groupings to determine which grouping the given message is more associated with and may tag the given message based on that grouping. Alternatively, the given message may be tagged as being associated with the two or more groupings and may be accessible via two different threads.

A user may be granted access to two or more sub-threads (e.g., sub-threads 330 and 332 of FIG. 3) that are initiated based on messages from a main thread (e.g., main thread 300). For example, a user may generate messages that are determined to be related to two different groupings and, accordingly, the user may be granted access to the threads initiated based on those two different groupings.

One or more users that has access to a sub-thread initiated based on messages from a main thread may add and/or invite additional users that do not have access to the sub-thread. The additional users may be users that are part of the main thread or may be additional users that are not part of the main thread. The one or more users that add and/or invite additional users may do so using any applicable means such as additional user selection, a public link, private or public messaging, or the like.

Prior to initiating a thread, such as initiating a first thread at 208 of FIG. 2 and/or initiating a second thread at 212, user confirmation for initiating the thread may be obtained. Similarly, a user may notified and/or may grant permission via communication platform 107 prior to being granted access to an initiated thread.

Figure 4A:
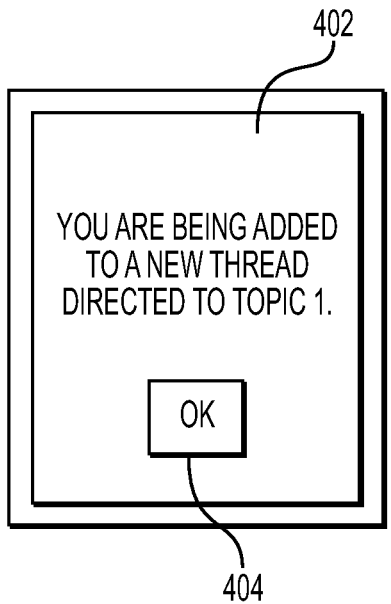
FIG. 4A depicts an example prompt, according to one or more embodiments.

FIG. 4A shows an example of a prompt 402 provided via communication platform 107. Prompt 402 may be provided to a user to notify the user that she is being added to a new thread related to a grouping (e.g., Topic 1 in the example provided in FIG. 4A). The prompt 402 may be a pop-up, a notification, a status, or the like. The user may select a confirm button 404 to acknowledge being added to a thread or may simply dismiss the prompt 402. The prompt 402 may be provided via communication platform 107 accessed on a user device 105. An account history or user profile may store a version of the prompt 402 such the user or a third party may be able to access information about which threads were initiated and/or which initiated threads the user joined.

Figure 4B:
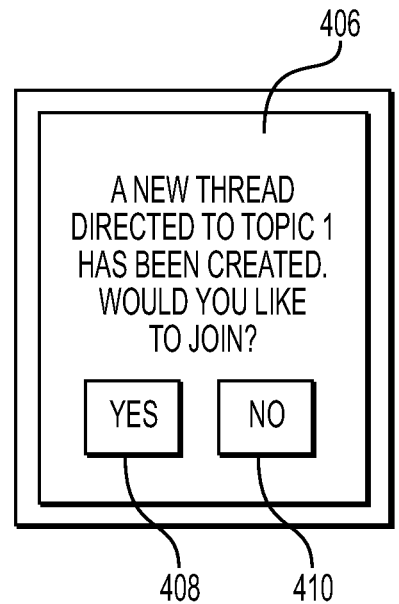
FIG. 4B depicts another example prompt, according to one or more embodiments.

FIG. 4B shows an example of a prompt 406 provided via communication platform 107. Prompt 406 may be provided to a user to request input from the user regarding whether or not to join a new thread related to a grouping (e.g., Topic 1 in the example provided in FIG. 4B). As shown, the prompt may request the user to select an affirmative button 408 or a decline button 410. By selecting the affirmative button 408, the user's device 105 may be granted access to the corresponding thread via communication platform 107 and by selecting the decline button 410, the user may not gain access to the corresponding thread via communication platform 107.

Figure 4C:
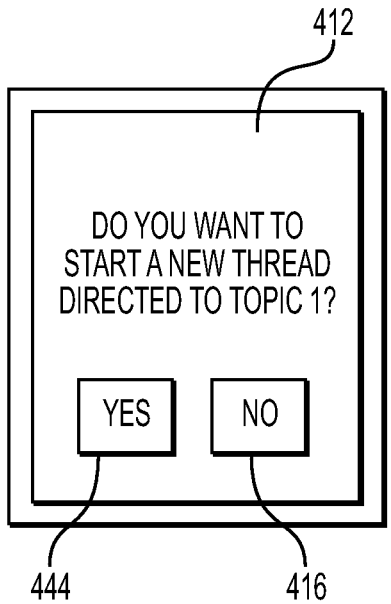
FIG. 4C depicts another example prompt, according to one or more embodiments.

FIG. 4C shows an example of a prompt 412 provided via communication platform 107. Prompt 412 may be provided to a user to request input from the user regarding whether or not to initiate a new thread directed to a given grouping (e.g., Topic 1 in the example provided in FIG. 4C). Prompt 412 may be provided to a user that provides one or more messages, via platform 107, related to the given grouping. For example, a User A may generate the most number of messages that are determined to be related to Topic 1 and, accordingly, prompt 412 may be provided to User A such that User A may determine if a new thread based on Topic 1 should be initiated. Alternatively, prompt 412 may be provided to an administrator or other designated user such that the administrator or other designated user may determine if a new thread based on Topic 1 should be initiated. Prompt 412 may be provided via communication platform 107 prior to steps 208 and/or 210 of FIG. 2 such that the first thread and/or second thread of FIG. 2 may be initiated if a selection of affirmative button 444 is made from prompt 412. If the decline button 416 is selected, the corresponding new thread may not be initiated.

Figure 4D:
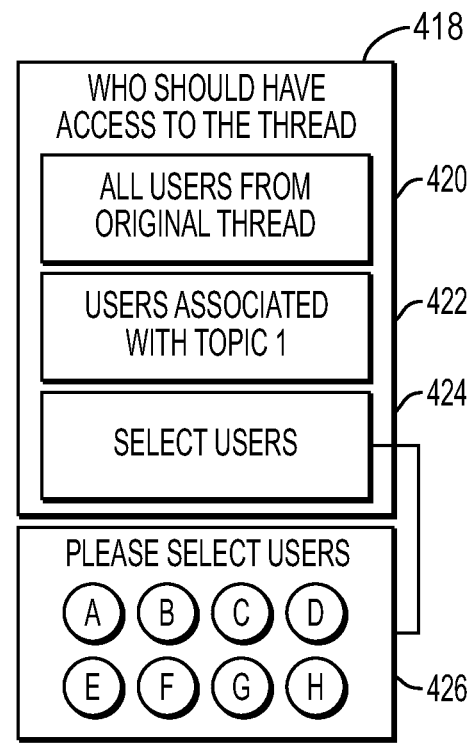
FIG. 4D depicts an example user access prompt according to one or more embodiments.

According to an implementation, as shown in FIG. 4D, prompts 418 and/or 426 may be provided to determine user access to an initiated thread. Prompts 418 and/or 426 may be generated independently such that a user (e.g., an administrator, a user that generated the most messages for a given grouping, other designated user, etc.) may receive prompts 418 and/or 426 before a new thread is initiated. Alternatively, prompts 418 and/or 426 may be provided to a user upon the user's selection of the confirm button 404 of FIG. 4A, the affirmative button 408 of FIG. 4B, or the affirmative button 444 of FIG. 4C.

Prompt 418 may include multiple options related to which users should have access to a new thread being initiated. The options may include an option to allow all users of a main thread to have access to the new thread being initiated using button 420, to allow only users that are associated with a given grouping (e.g., Topic 1) using button 422, and/or to allow select users to be granted access using button 424. If button 424 is selected to allow select users to be granted access, prompt 426 may be provided via the communication platform 107 such that a user may select one or more users from plurality of users available via prompt 426. The users selected via prompt 426 may be granted access to the initiated thread.

According to an implementation of the disclosed subject matter, a plurality of messages from two or more communication platforms may be provided to a machine learning model 111 that may determine if subsets of the plurality of messages correspond to one or more groupings. Based on grouping determinations made by the machine learning model 111, one or more threads may be initiated on one or the multiple communication platforms, and may include the corresponding messages.

Figure 5:
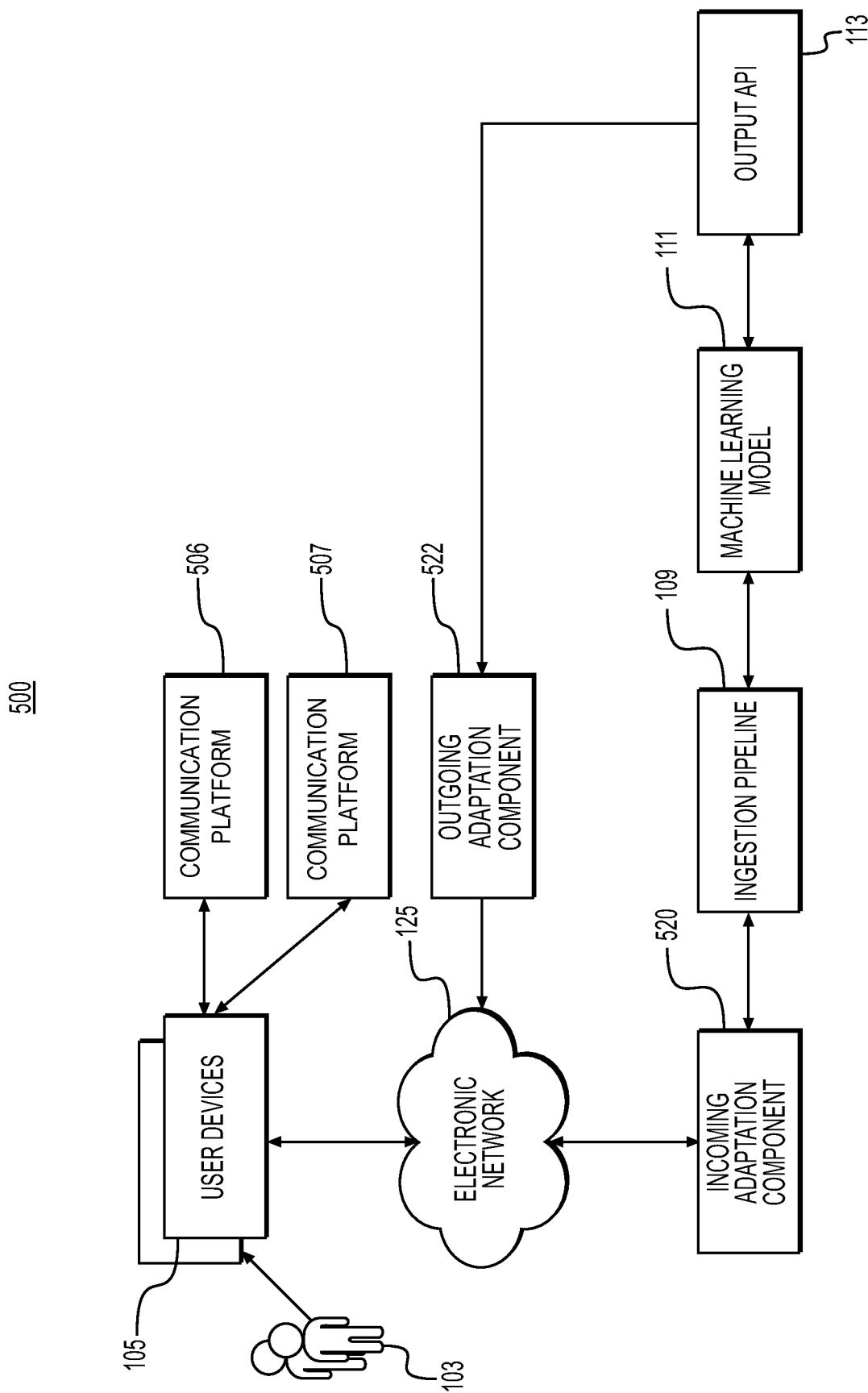
FIG. 5 depicts an exemplary computing environment for generating contextual threads from multiple communication platforms, according to one or more embodiments.

FIG. 5 depicts an exemplary computing environment 500 that may be utilized with techniques presented herein. In some embodiments, the computing environment 500 is, includes, and/or forms a portion of a contextual thread generator. Computing environment 500 may be similar to computing environment 100 of FIG. 1 and may include some overlapping components such as user devices 105, electronic network 125, ingestion pipeline 109, machine learning model 111, and output API 113. For brevity, the overlapping components from computing environment 100 and computing environment 500 are not described again as it will be understood that these components operate in similar manner as previously described.

As shown in FIG. 5, computing environment 500 includes a first communication platform 506, a second communication platform 507, an incoming adaptation component 520, an outgoing adaptation component 522 as well as components overlapping with the computing environment 100 of FIG. 1. Some or all of the components shown in computing environment 500 may communicate across an electronic network 125. Users 103 may use user devices 105 and generate a plurality of messages via the first communication platform 506 and/or the second communication platform 507. Although two communication platforms are shown in computing environment 500, it will be understood that computing environment 500 may be implemented using any number communication platforms greater than one.

The plurality of messages may be generated via the first communication platform 506 and/or the second communication platform 507 and may be provided to the incoming adaptation component 520 via electronic network 125. The incoming adaptation component 520 may be an independent component or may be part of the ingestion pipeline 109. The incoming adaptation component 520 may extract the content and context of the plurality of messages such that any communication platform-specific context and/or information is separated from the content and context of the messages before a combined plurality of messages (e.g., from multiple platforms) are provided to the ingestion pipeline 109. The messages provided by the incoming adaptation component 520 to the ingestion pipeline 109 may be in a universal format rather than a communication platform-specific format.

For example, the communication platforms 506 and 507 may apply platform-specific information such as platform-specific code, text, markers, pointers, or other information to each of its messages that are received at the incoming adaptation component 520. The platform-specific information may be necessary for the respective platform (e.g., first communication platform 506, second communication platform 507, etc.) to produce, display, store, or otherwise use messages generated via the respective platform. However, such platform-specific information may not be readable or usable by the ingestion pipeline 109 when preparing the respective messages to be input into the machine learning model 111. The incoming adaptation component 520 may adapt each of the plurality of messages generated via the respective platforms such that they are normalized to be used by the ingestion pipeline 109 and prepared for input into the machine learning model 111. Accordingly, incoming adaptation component 520 may prepare the messages such that the ingestion pipeline 109 receives non-communication platform-specific messages and may perform its operations to prepare the non-communication platform-specific messages for input to the machine learning model 111. According to an implementation, the incoming adaptation component 520 and outgoing adaptation component 522 may also be used in the computing environment 100.

As disclosed herein, the machine learning model 111 may determine if two or more messages are associated with the same grouping and, based on the determination, a grouping-based thread may be initiated.

A grouping-based thread may be initiated in each of the available communication platforms (e.g., first communication platform 506, second communication platform 507, etc.). According to this implementation, the machine learning model 111 may determine the groupings associated with one or more messages and provide the information and/or the messages to the output API 113. The output API 113 may modify the output of the machine learning model 111 for subsequent input as messages in one or more threads. The output of the output API 113 may be provided to the outgoing adaptation component 522 and the output adaptation component 522 may configure the messages with platform-specific information based on the one or more communication platforms where the one or more grouping-based threads are initiated. Accordingly, one or more grouping-based threads may be initiated in each communication platform (e.g., first communication platform 506, second communication platform 507, etc.) and the subset of messages associated with that grouping, where the subset of messages may originally be from a combination of the platforms, may be provided via each communication platform in the initiated grouping-based thread on each communication platform.

As an example, a first platform may be a messaging platform and a second platform may be forum. According to this implementation, messages from the messaging platform and the forum may be received at the incoming adaptation component 520 which may normalize the messages and provide them to the ingestion pipeline 109. The ingestion pipeline 109 may prepare the messages for the machine learning model 111 which may determine that a subset of messages are related to a first grouping. The subset of messages may be provided to the outgoing adaptation component 522 via the output API 113 and the outgoing adaptation component 522 may modify the messages such that they can be received and provided to the user devices 105 via both the messaging platform and the forum.

According to another implementation, grouping based threads may be initiated in a single platform when messages from multiple platforms are determined to be related to a grouping. According to this implementation, the single platform may be determined based on a predetermined preference (e.g., set by an organization, by users, set based on the communication platforms, a priority list, etc.) or based on the messages (e.g., based on which platform more of the messages originated from). The outgoing adaptation component 522 may modify the messages received from the output API 113 based on the single communication platform via which the corresponding grouping-based thread is initiated.

The systems and devices of the computing environment 500 may communicate in any arrangement. As discussed herein, systems and/or devices of the computing environment 500 may communicate in order to operate a contextual thread generator, e.g., by automatically generating sub-threads based on the context of messages provided in a main thread.

Figure 6:
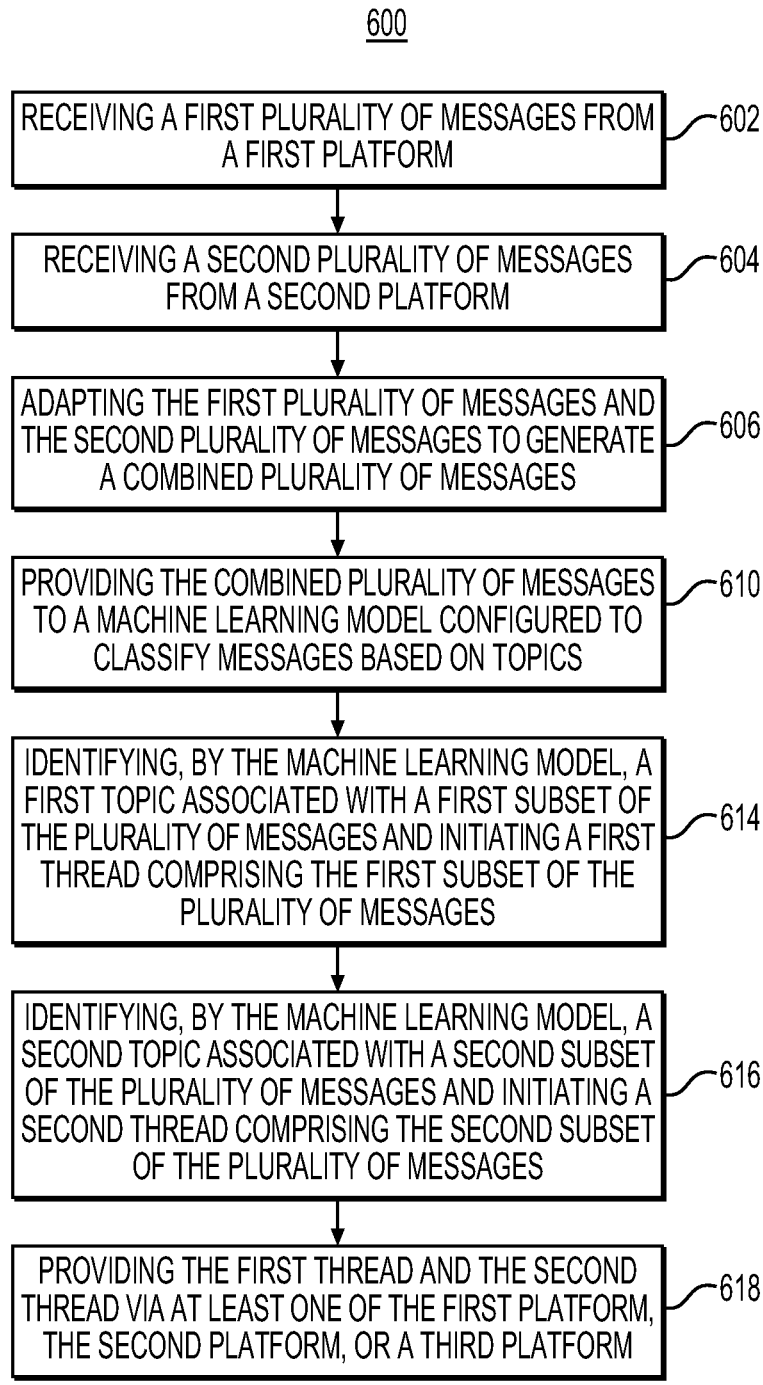
FIG. 6 depicts a flowchart of an exemplary method for generating contextual threads from multiple communication platforms, according to one or more embodiments.

FIG. 6 illustrates an exemplary process 600 for generating contextual threads, e.g., via a machine learning model 111, based on a plurality of messages from multiple communication platforms. At 602 of FIG. 6, a plurality of messages may be received from a first platform and at 604 a plurality of messages may be received from a second platform. The plurality of messages may be generated using one or more user devices 105, such as via inputs provided to the user devices 105. The inputs may be any applicable input including touch, keystrokes, voice commands, gestures, taps, gaze, electrical signal, photograph, video, audio, haptic input, etc. The user devices 105 may convert the inputs into the plurality of messages based on hardware, software, and/or firmware associated with each respective user device and/or based on one or more software configurations of the respective multiple communication platforms (e.g., first communication platform 506, second communication platform 507, etc.). The plurality of messages from the multiple communication platforms may be received at a cloud platform via electronic network 125.

The plurality of messages may be filtered through an incoming adaptation component 520 to remove communication platform-specific attributes of the messages, as discussed herein. The streamlined messages may then be provided to an ingestion pipeline 109, as described herein. The ingestion pipeline 109 may move the plurality of streamlined messages to a data lake configured to apply the messages to the machine learning model 111. The ingestion pipeline 109 may organize the messages, modify data (e.g., metadata, content, etc.), apply context (e.g., temporal context, structural context, etc.), or the like such that the output of the ingestion pipeline 109 at 606 of FIG. 6 can be used as input to the machine learning model 111 at step 610.

The machine learning model 111 may identify a first topic associated with a first subset of the plurality of messages and initiate a first thread comprising the first subset of the plurality of messages at 614. The first subset of the plurality of messages may include messages from both the first platform the second platform. Similarly, the machine learning model 111 may identify a second topic associated with a second subset of the plurality of messages and initiate a second thread comprising the second subset of the plurality of messages a 616. The second subset of the plurality of messages may include messages from both the first platform and the second platform. At 618, the first thread and the second thread may be provided via at least one of the first communication platform, the second communication platform, and/or a third communication platform. The third communication platform may be similar to or different than the first communication platform and/or the second communication platform and may be accessed via the user devices 105. For example, the first platform may be an email platform, the second platform may be a forum, and the third platform may be a messaging service.

In some embodiments, the method above, and/or portions thereof may be performed periodically, iteratively, or the like. For example, in some embodiments, the computing environment 100 and/or computing environment 500 may be configured and further configured, from time to time, as the machine learning model 111 receives more messages such that it may associate more messages with groupings or may identify additional groupings based both on historical messages and new messages. In some embodiments, such iterative operation may enable the computing environment 100 and/or computing environment 500 to dynamically adapt to changes in groupings, changes in frequency of messages, and changes in communication platforms.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the process illustrated in FIGS. 2 and 6, may be performed by one or more processors of a computer system, such any of the systems or devices in the computing environments of FIGS. 1 and 5, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIGS. 1 and 5. One or more processors of a computer system may be included in a single computing device or distributed among a plurality of computing devices. One or more processors of a computer system may be connected to a data storage device. A memory of the computer system may include the respective memory of each computing device of the plurality of computing devices.

Figure 7:
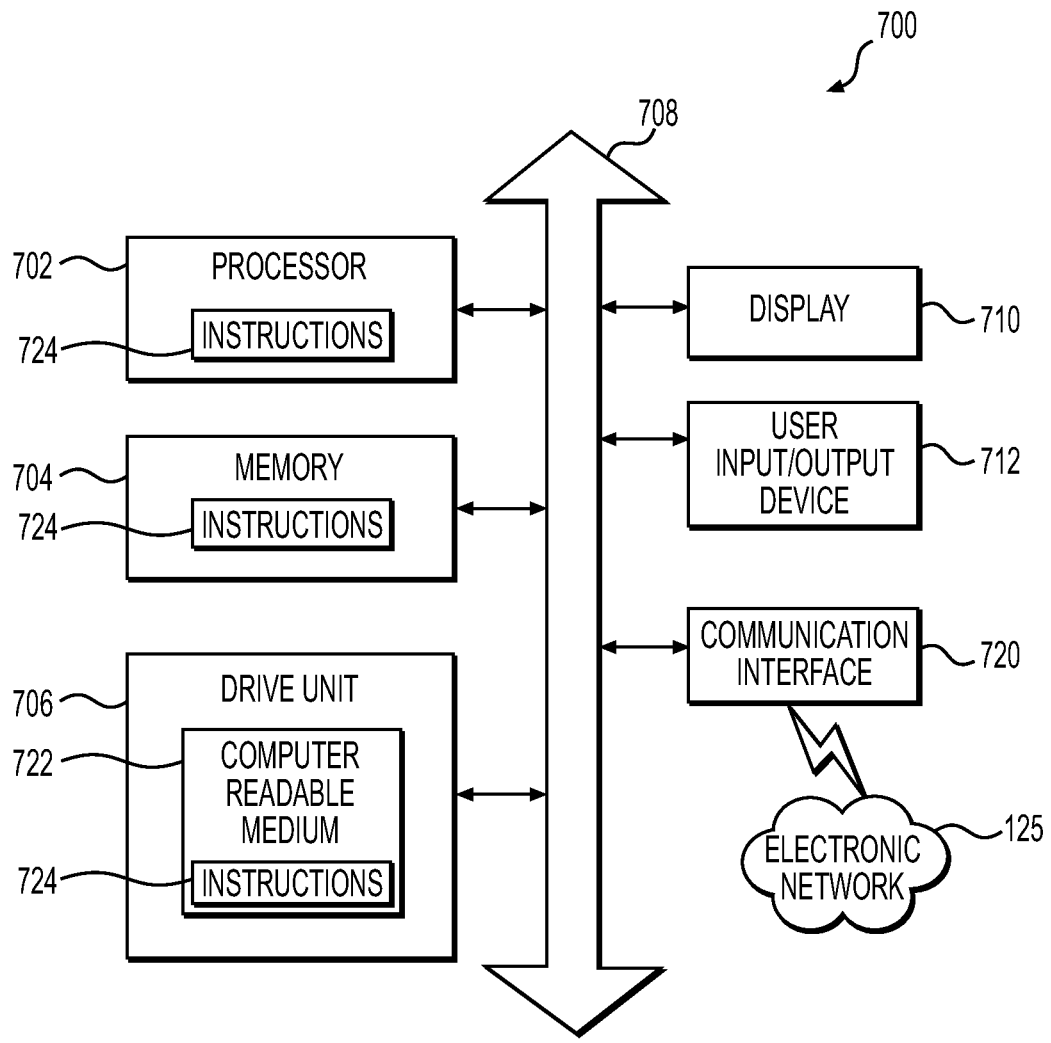
FIG. 7 depicts an example of a computing device, according to one or more embodiments.

FIG. 7 is a simplified functional block diagram of a computer system 700 that may be configured as a device for executing the methods of FIGS. 2 and 6, according to exemplary embodiments of the present disclosure. FIG. 7 is a simplified functional block diagram of a computer system that may generate contextual threads and/or another system according to exemplary embodiments of the present disclosure. In various embodiments, any of the systems (e.g., computer system 700) herein may be an assembly of hardware including, for example, a data communication interface 720 for packet data communication. The computer system 700 also may include a central processing unit ("CPU") 702, in the form of one or more processors, for executing program instructions. The computer system 700 may include an internal communication bus 708, and a storage unit 706 (such as ROM, HDD, SDD, etc.) that may store data on a computer readable medium 722, although the computer system 700 may receive programming and data via network communications. The computer system 700 may also have a memory 704 (such as RAM) storing instructions 724 for executing techniques presented herein, although the instructions 724 may be stored temporarily or permanently within other modules of computer system 700 (e.g., processor 702 and/or computer readable medium 722). The computer system 700 also may include input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, a mobile device, a wearable device, a text-based platform, an audio-based platform, a video-based platform, an automobile communication system, a home communication system, etc. Also, the presently disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for aggregation of messages, the method comprising:

receiving a plurality of messages in a thread associated with a topic;

providing the plurality of messages to a machine learning model configured to classify messages based on groupings;

identifying, by the machine learning model, a first grouping associated with a first subset of the plurality of messages in the thread, wherein the first grouping is identified based on the first subset of the plurality of messages deviating from the topic, wherein:

deviating from the topic is defined by at least one respective message being associated with a outlier topic that is different than the topic; and the machine learning model identifies a first subset of the plurality of messages as corresponding to the outlier topic;

initiating a first thread comprising the first subset of the plurality of messages;

determining a first user group comprising a first plurality of users associated with the first subset of the plurality of messages and granting, the first user group, access to the first thread, wherein the first grouping is based on a first topic associated with the first subset of the plurality of messages; and identifying, by the machine learning model, a second grouping based on a second topic associated with a second subset of the plurality of messages and initiating a second thread comprising the second subset of the plurality of messages; and determining a second user group comprising a second plurality of users associated with the second subset of the plurality of messages and granting, the second user group, access to the second thread, wherein the first user group and the second user group comprise at least one non-overlapping user.

2. The computer-implemented method of claim 1, wherein deviating from the topic is further defined by one or more of being unrelated to a topic, being related to a subset of the topic, or being related to a secure topic.

3. The computer-implemented method of claim 1, wherein identifying the first grouping is further based on one or more of a frequency of messages or a subset of a group of users providing messages.

4. The computer-implemented method of claim 1, further comprising:
receiving a user confirmation for initiating the first thread, wherein initiating the first thread is based on the user confirmation.

5. The computer-implemented method of claim 1, wherein the first user group is determined based on an access permission associated with the outlier topic.

6. The computer-implemented method of claim 1, further comprising training the machine learning model to classify a plurality of unclassified messages based on a common topic associated with the plurality of unclassified messages.

7. The computer-implemented method of claim 6, wherein the machine learning model includes one or more of a regression model, a decision tree model, a naïve Bayes model, a k-means model, a random forest model, a reduction model, or a gradient boosting model.

8. The computer-implemented method of claim 1, wherein the plurality of messages are received as part of a main thread and initiating the first thread comprising the first subset of messages comprises removing the first subset of messages from the main thread.

9. The computer-implemented method of claim 8, further comprising:
receiving a new message at the main thread;
determining that the new message corresponds to the first grouping; and
moving the new message to the first thread based on determining that the new message corresponds to the first grouping.

10. The computer-implemented method of claim 8, further comprising receiving a first thread message at the first thread such that the first thread message is not provided at the main thread.

11. A computer-implemented method for topic-based aggregation of messages, the method comprising:
receiving a first plurality of messages from a first platform;
receiving a second plurality of messages from a second platform;
adapting the first plurality of messages and the second plurality of messages to generate a combined plurality of messages;
providing the combined plurality of messages to a machine learning model configured to classify messages based on groupings;
identifying, by the machine learning model, a first grouping associated with a first subset of the combined plurality of messages, and initiating a first thread comprising the first subset of the combined plurality of messages;

identifying, by the machine learning model, a second grouping associated with a second subset of the combined plurality of messages different than the first subset of the combined plurality of messages, and initiating a second thread comprising the second subset of the combined plurality of messages;
determining a first user group comprising a first plurality of users associated with the first subset of the plurality of messages and granting, the first user group, access to the first thread; and
determining a second user group comprising a second plurality of users associated with the second subset of the plurality of messages and granting, the second user group, access to the second thread, wherein the first user group and the second user group comprise at least one non-overlapping user; and
providing the first thread and the second thread via at least one of the first platform, the second platform, or a third platform.

12. The method of claim 11, wherein adapting the first plurality of messages and the second plurality of messages comprises:
converting the first plurality of messages and the second plurality of messages into a universal format; and
extracting content of the first plurality of messages and the second plurality of messages to remove platform-specific context.

13. The method of claim 11, wherein providing the first thread and the second thread via at least one of the first platform, the second platform, or the third platform comprises receiving a user selection of the at least one of the first platform, the second platform, or the third platform.

14. The method of claim 11, wherein providing the first thread and the second thread via at least one of the first platform, the second platform, or the third platform comprises a predetermined selection of the at least one of the first platform, the second platform, or the third platform.

15. The method of claim 11, further comprising extracting, via an ingestion pipeline, content of the combined plurality of messages related to platform-specific context of the first platform and the second platform associated with each of the combined plurality of messages.

16. The method of claim 11, further comprising receiving a user confirmation for initiating the first thread, wherein initiating the first thread is based on the user confirmation.

17. The method of claim 11, wherein initiating the first thread and initiating the second thread comprises removing the first plurality of messages from the first platform and the second plurality of messages from the second platform.

18. The method of claim 11, wherein the third platform is accessible by users of the first platform and the second platform.

19. A system comprising:
a data storage device storing processor-readable instructions;
an aggregation bot comprising a machine learning model configured to classify messages based on topics; and
a processor operatively connected to the data storage device and configured to execute the instructions to perform operations that include:
receiving a plurality of messages;
providing a first version of the plurality of messages to the aggregation bot;
identifying, by the aggregation bot, a first topic associated with a first subset of the plurality of messages and initiating a first thread comprising the first subset of the plurality of messages;

identifying, by the aggregation bot, a second topic associated with a second subset of the plurality of messages different than the first topic associated with the first subset of the plurality of messages, and initiating a second thread comprising the second subset of the plurality of messages;

determining a first user group comprising a first plurality of users associated with the first subset of the plurality of messages and granting, the first user group, access to the first thread; and determining a second user group comprising a second plurality of users associated with the second subset of the plurality of messages and granting, the second user group, access to the second thread, wherein the first user group and the second user group comprise at least one non-overlapping user.

* * * * *